(12) United States Patent
Odeh

(10) Patent No.: US 6,588,370 B1
(45) Date of Patent: Jul. 8, 2003

(54) LABYRINTH WEIR AND POOL FISHWAY

(75) Inventor: Muffeed Odeh, Gill, MA (US)

(73) Assignee: The United States of America as represented by the Secretary of the Interior, Washington, DC (US)

(*) Notice: Subject to any disclaimer, the term of this patent is extended or adjusted under 35 U.S.C. 154(b) by 0 days.

(21) Appl. No.: 09/874,234

(22) Filed: Oct. 3, 2001

(51) Int. Cl.[7] .............................. A10K 61/00; E02B 8/08
(52) U.S. Cl. ........................... 119/219; 405/81; 405/83
(58) Field of Search .......................... 43/101; 19/219, 19/220; 405/81, 82, 84, 83

(56) References Cited

U.S. PATENT DOCUMENTS

| | | | | |
|---|---|---|---|---|
| 1,376,889 A | * | 5/1921 | Kirby | 405/107 |
| 2,625,798 A | * | 1/1953 | Reed | 405/81 |
| 2,922,282 A | * | 1/1960 | Dohrer | 119/219 |
| 3,962,876 A | * | 6/1976 | Phillips | 405/81 |
| 4,260,286 A | * | 4/1981 | Buchanan | 405/81 |
| 5,139,364 A | * | 8/1992 | Takahashi et al. | 405/100 |
| 6,102,619 A | * | 8/2000 | Truebe et al. | 119/219 |

FOREIGN PATENT DOCUMENTS

| | | | | |
|---|---|---|---|---|
| FR | 2614505 A1 | * | 11/1988 | E02B/8/08 |
| JP | 04149306 A | * | 5/1992 | E02B/8/08 |
| JP | 06257126 A | * | 9/1994 | E02B/8/08 |

* cited by examiner

*Primary Examiner*—Charles T. Jordan
*Assistant Examiner*—Susan C. Alimenti
(74) *Attorney, Agent, or Firm*—Ross F. Hunt, Jr.

(57) ABSTRACT

A fishway is disclosed for providing a pathway around obstacles for fish. The fishway is comprised of a pair of spaced fishway walls and a set of weirs located between the fishway walls for dissipating flow energy of water flowing through the fishway. The weirs are disposed in longitudinally spaced relation along the fishway and each consecutive pair of weirs defines a pool between the pair. The weirs are comprised of a center wall, first and second middle walls attached to the center wall on opposite sides of the center wall, and first and second outer walls which are attached at one edge to the first and second middle walls respectively and at the opposite edge to a respective one of the fishway walls. The first and second middle walls form an acute angle facing away from the flow of the water, and each attached middle and outer wall, respectively, form an angle facing towards the flow of the water which is less than 180°.

9 Claims, 3 Drawing Sheets

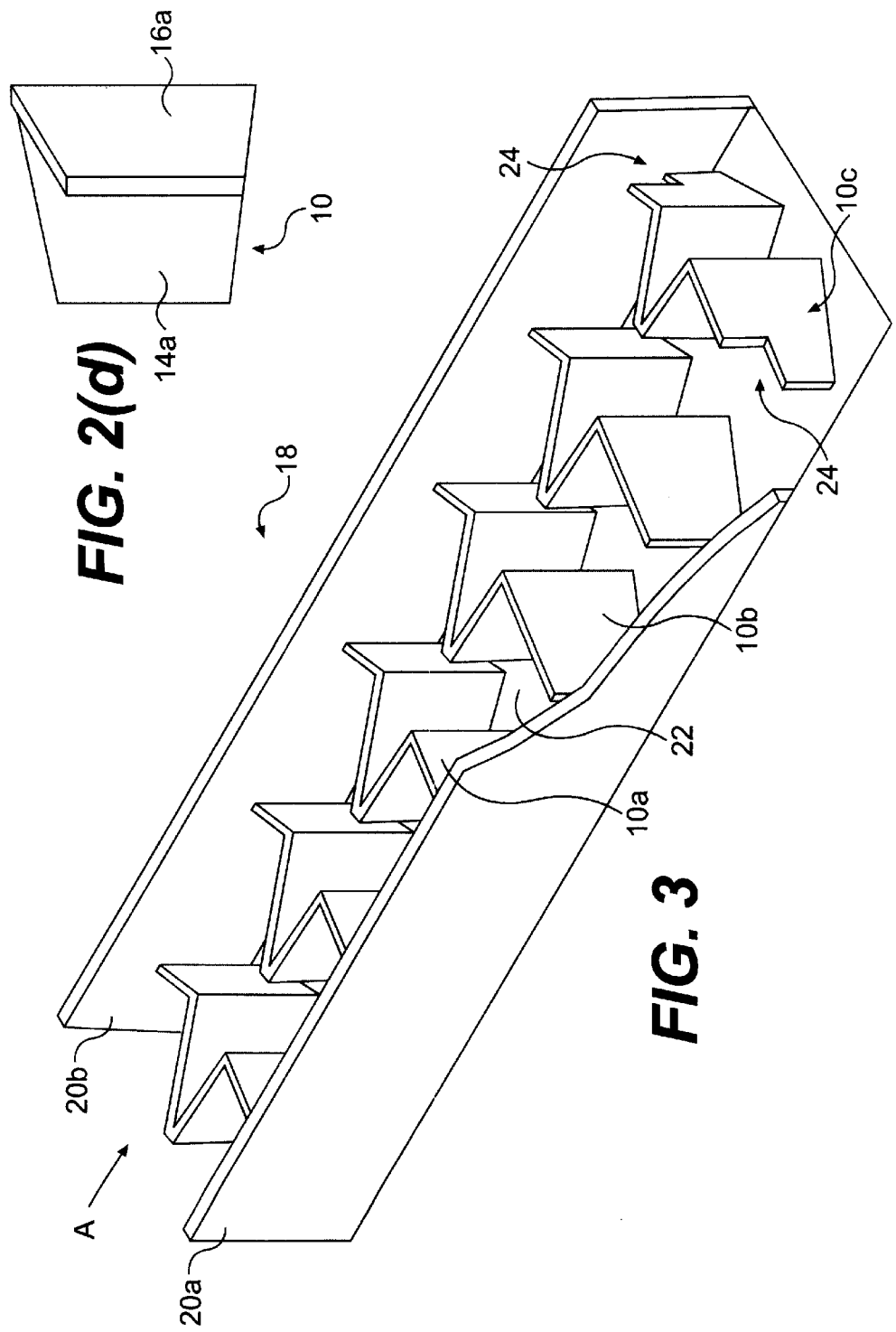

LABYRINTH WEIR AND POOL FISHWAY

BACKGROUND OF THE INVENTION

1. Field of the Invention

This invention relates generally to the field of fishways, and more specifically, relates to a labyrinth weir and pool fishway for passing fish upstream around an obstacle.

2. Related Art

When a manmade obstacle such as a dam is placed in a flowing body such as a river or stream, the obstacle can have a devastating impact on some species of fish within the body of water. Some types of fish such as salmon and shad need to move upstream during parts of their lives for purposes such as spawning and feeding. When an obstacle is placed in the way of these fish, upstream movement of the fish is stopped. This restriction of movement can result in the elimination of entire species of fish from that body of water.

The passage of fish around obstacles to feeding and spawning areas, upstream is an ongoing concern to many federal agencies such as the Fish and Wildlife Service (FWS) and the Environmental Protection Agency (EPA). In addition, it is a matter of concern to, among others, state and local conservation departments and agencies, non-governmental groups, utility companies, and the public. Most prominent is the need for an efficient fish passage means over dams without the need for extensive reconstruction of the dam structure or of the surrounding area.

Fishways have been designed for assisting species such as salmon to move upstream despite manmade obstacles. To be successful, the hydraulic conditions of a given fishway must be such as to not overtax the energy of the type or types of fish using the fishway. Water flow should be sufficient for fish migration, but the energy of the flow should be low enough so that the fish can travel upstream through the fishway.

A typical fishway within the prior art of the pool and weir type is illustrated in FIG. 1. The fishway 6 is comprised of a pair of fishway sides, denoted 7a and 7b, and a series of barriers, or weirs, denoted 8a, 8b, and 8c, between the sides 7a, 7b. Each pair of weirs defines a pool area therebetween. The large arrow within the fishway, denoted "A", indicates the direction of water flow. A strong fish, such as a salmon moves past the weirs 8a, 8b, 8c and the pool areas defined by the weirs, and continues along the fishway in such fashion until the barrier in the waterway has been circumvented.

Existing fishways such as the prior art fishway of FIG. 1 are typically designed for fish with strong swimming and jumping capabilities such as salmon. Salmon are strong swimmers and are able to jump over moderately heights when necessary to move upstream in a river or fishway.

However, the need to preserve an entire ecosystem, and all the species within the ecosystem, has been recognized. Non-salmon and non-salmon-related fish populations have also suffered as a result of manmade obstacles in rivers. Many riverine fish are in danger because some species have a need to migrate up and down river throughout periods of their lives as well. Fishways are required, therefore, which allow all fish in a waterway to pass, rather than only the superior swimming and jumping fish. By way of example, American Shad are adversely affected by blocked upstream passage, but do not perform as well as salmon in fishways.

SUMMARY OF THE INVENTION

In accordance with the invention, a labyrinth weir and pool fishway is provided for facilitating upstream fish movement around obstacles, the fishway comprising: a pair of spaced fishway walls, and a plurality of weirs located between the fishway walls for dissipating flow energy of water flowing through the fishway, the weirs being disposed in longitudinally spaced relation along the fishway and each consecutive pair of weirs defining a pool therebetween; each of the weirs comprising: a center wall; first and second middle walls attached to the center wall on opposite sides thereof so that the first and second middle walls form an acute angle facing away from the flow of the water; first and second outer walls attached at one edge thereof to the first and second middle walls respectively and at the opposite edges to a respective one of the fishway walls, and the first middle and outer walls and the second middle and outer walls each forming an angle therebetween facing towards the flow of the water which is less than 180°.

Preferably, the outer walls have a top edge which slopes downwardly toward a respective one of the fishway walls.

Advantageously, the middle walls form an acute angle of about 30°.

Preferably, the angle formed between the respective middle and outer walls is about 75°.

Advantageously, each weir provides contact with a cross sectional area of water at least 150% that provided by a straight weir between the fishway walls.

Preferably, the center wall is rectangular in shape.

Advantageously, the middle walls are rectangular in shape.

The fishway allows fish to pass upstream around structures such as dams and turbines without extensive reworking of the dam structure or the surrounding area. This design may be adapted for use at many different fish passage locations. The fishway construction of the invention design can be used in new installations or to retrofit existing fishways that have proven ineffective.

Other features and advantages of the invention will be set forth in, or will be apparent from, the detailed description of the preferred embodiments which follows.

BRIEF DESCRIPTION OF THE DRAWINGS

FIG. 2(d) is a schematic side elevational view of the weir illustrated in FIG. 2(a).

FIG. 3 Is a partially cut away, schematic perspective view of a preferred embodiment of the weir and pool fishway of the invention, employing weir corresponding to that of FIGS. 2(a)–2(d).

DESCRIPTION OF THE PREFERRED EMBODIMENTS

Figure 1:
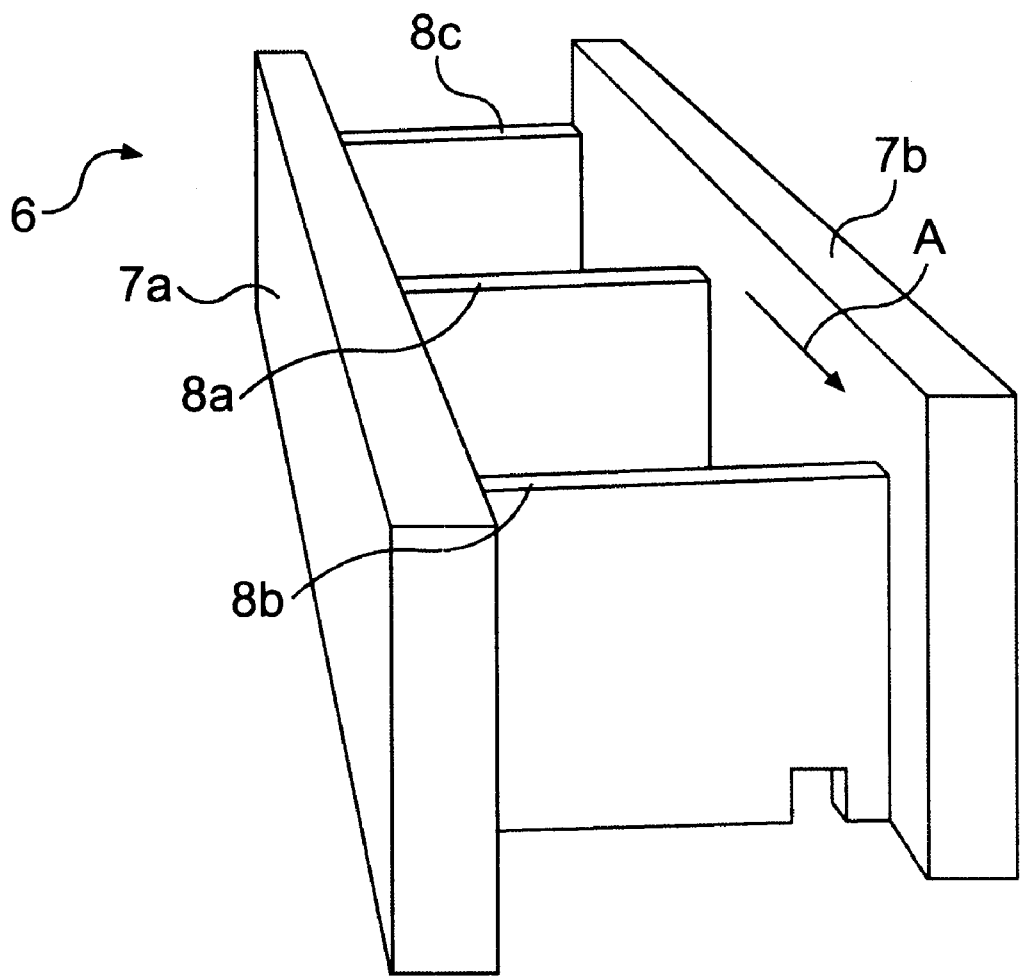
FIG. 1, which was described above, is a schematic perspective view of a prior art weir and pool system.

Referring to FIGS. 2a–2d, wherein corresponding elements have been given the same reference numbers throughout the figures, a labyrinth weir, generally denoted 10, is provided. A large arrow A indicates the direction of water flow past the weir 10.

The weir includes a center wall 12 located in the center of the weir. The center wall 12 is tall and narrow, and is attached to a pair of middle walls, denoted 14a and 14b, which are located to either side of the center wall 12. The center wall 12 is typically bout the same height as the middle walls 14a, 14b with a much narrower width. The middle walls 14a, 14b are each attached at diametrical opposite sides to the center wall 12. Upon attachment to the center wall 12, the middle walls 14a, 14b form an acute angle which faces generally away from the incoming water flow. In the embodiment illustrated, the acute angle is about 30°.

Each of the middle walls 14a, 14b, is in turn, attached to a respective one of a pair of outer walls 16a, 16b, respectively. Each middle wall 14a, 14b is attached to each respective outer wall 16a, 16b on the opposite side from the attachment thereof to the center wall 12.

In an advantageous implementation, the top of each of the outer walls 16a, 16b, of the weir 10 slopes downwardly away from the corresponding side of each outer wall 16a, 16b attached to middle walls 14a and 14b, respectively. Each of the middle walls 14a, 14b and its respective accompanying outer wall 16a, 16b form an angle of less than 180° facing the direction of the water flow. In the illustrated embodiment; the angle is about 75°. The weir 10 can be constructed of a material or materials already known in the art.

Figure 2A:
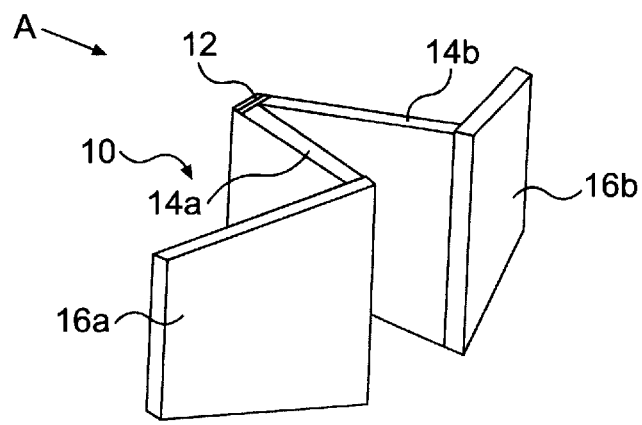
FIG. 2(a) is a schematic perspective view of an embodiment of a weir of the invention.
Figure 2B:
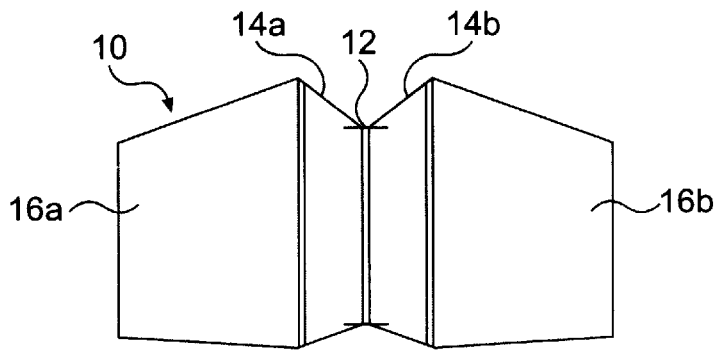
FIG. 2(b) is a schematic rear elevational view of the weir illustrated in FIG. 2(a).
Figure 2C:
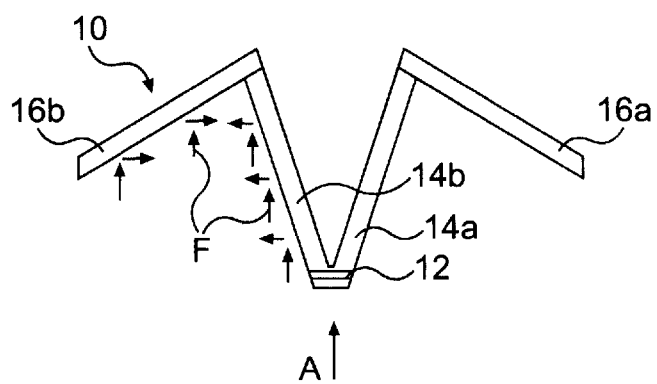
FIG. 2(c) is a schematic top plan view of the weir illustrated in FIG. 2(a).

Referring specifically to FIG. 2(c), the role of the weir design in reducing water velocity and dissipating overall flow energy is illustrated. More specifically, the design of the labyrinth weir 10 results in secondary flows which reduce the overall flow energy of the water, and thus reduce the velocity of the flow of water over the top of the weir 10. A secondary flows occur when an obstruction forces a flow of water to move in a different direction than that of the main flow. A cross flow resulting from contact between the main flow and secondary flows reduces the energy of the main flow.

A be seen, the main flow A first contacts the center wall 12. Shortly thereafter, part of the main flow A contacts the angled middle walls. Finally, a part of main flow A contacts the angled outer walls 16a, 16b.

As can be seen by a group of smaller representative flow arrows F between representative middle wall 14b and outer wall 16b, the main flow A becomes disrupted because of the angular design of the weir 10. The velocity of the parts of the main flow A are turned in a partly sideways direction relative to the main flow by the angled weir walls. This disruption results in secondary flows F which dissipate energy from the main flow by moving in cross flows to the main flow A. In addition to horizontal dissipation of flow as illustrated, flow is additionally dissipated in the vertical direction by upward and downward flows initiated by the weir construction.

Flow velocity over the weir 10 is lowered because the angled shape of the labyrinth weir results in a weir with a much greater surface area in contact with the flow, and hence a much greater cross section of flow than the cross section which presented in the case of a straight weir. Typically the labyrinth weir is capable of contact with a cross sectional area of water at least 150% that of a straight weir of the same height. Water velocity over the labyrinth weir 10 is reduced because of the wider cross section available at the top of the weir 10 through which the flow of water may pass. In other words, the increase in cross sectional area of the water flow brings about a corresponding decrease in velocity of the flowing water. This concept is easily understood using the equation; flow=area×velocity. The decrease in velocity of the water flow also results in a corresponding decrease in the unit momentum of the flow over the weir. This decrease is explained by the formula momentum=mass×velocity.

Turning to FIG. 3, a fishway 18 using a system of the labyrinth weirs is illustrated. A large arrow A indicates the direction of water flow through the fishway. Fish approach the fishway 18 from the opposite side of the flow seeking to move upstream. As the fish approach the fishway 18, the fish encounter a series of labyrinth weirs. Each pair of consecutive weirs defines a pool area between the weirs. A pair of representative weirs are denoted 10a and 10b and a representative pool area is denoted 22. The weirs 10a, 10b are disposed between and affixed at the outer, opposite edges thereof to a pair of fishway walls, denoted 20a and 20b.

The fish move past the weirs and pool areas and through the fishway 18. While moving through the weirs, the fish are helped greatly by the shape of the weirs and their effect upon waterflow coming from the opposite direction. As discussed above, the angled shape of the labyrinth weir 10 reduces the flow velocity which the fish must face.

As shown in FIG. 3, for weir 10c, a pair of side slots 24 are located in the respective outer walls adjacent to the respective fishway walls 20 and 20b. The side slots 24 can vary in width and depth depending on the depth of the water desired in the fishway and the amount of flow needed.

As indicated previously, flow energy dissipation occurs in the vertical and lateral directions between the labyrinth weirs 10a, 10b due to the compound angles of their construction. This energy dissipation within the pool results in more favorable flow hydraulics in the fishway providing the fish with better passage conditions. Because of the reduced flow velocity and energy dissipation, the fish is able to more easily ascend through the weirs of the fishway 18. This dissipation provides multiple routes of passage through the fishway 18 for weaker as well as stronger fish. As illustrated by weirs 10a and 10b, the tops of the weirs are sloped downward toward the fishway walls 20a, 20b so as to provide fish with an area of adequate depth to pass through the weirs during low flow conditions.

Movement of the fish through the pools and weirs continues until the fish have moved through the entire fishway 18, safely circumventing the manmade obstacle, and continuing on their way upstream. The design allows the fish, regardless of swimming or jumping ability, to pass upstream.

Although the invention has been described above in relation to preferred embodiments thereof, it will be readily understood by those skilled in the art that variations and modifications can be effected in these embodiments without departing from the scope and spirit of the invention.

What is claimed is:

1. A labyrinth weir and pool fishway for providing a pathway around obstacles for fish, comprised of:

a pair of spaced fishway walls, and a plurality of weirs located between the fishway walls for dissipating flow energy of water flowing through the fishway, said weirs being disposed in longitudinally spaced relation along the fishway and each consecutive pair of weirs defining a pool therebetween;

each of said weirs comprising:

a center wall having first and second middle walls attached to the center wall on opposite sides thereof so that the first and second middle walls form an acute angle facing away from the flow of the water; and first and second outer walls attached at one edge thereof to said first and second middle walls respectively and at the opposite edges to a respective one of said fishway walls, said first middle and outer walls and said second middle and outer walls each forming an angle therebetween facing towards the flow of the water which is less than 180°.

2. A labyrinth weir and pool fishway according to claim 1, wherein said outer walls have a top edge which slopes downwardly toward a respective one of said fishway walls.

3. A labyrinth weir and pool fishway according to claim 1, wherein said middle walls form an acute angle of about 30°.

4. A labyrinth weir and pool fishway according to claim 1, wherein the angle formed between said respective middle and outer walls is about 75°.

5. A labyrinth weir and pool fishway according to claim 1, wherein each weir provides contact with a cross sectional area of water at least 150% that provided by a straight weir between the fishway walls.

6. A labyrinth weir and pool fishway according to claim 1, wherein the center wall is rectangular in shape.

7. A labyrinth weir and pool fishway according to claim 1, wherein said middle walls are rectangular in shape.

8. A labyrinth weir and pool fishway according to claim 1, wherein said outer walls include slots in an upper edge thereof through which water can flow.

9. A labyrinth weir and pool fishway according to claim 8 wherein said slots are located at respective portions of said outer walls located adjacent the respective fishway wall.

* * * * *